United States Patent [19]

Cheng et al.

[11] Patent Number: 5,737,392
[45] Date of Patent: Apr. 7, 1998

[54] TWO-PASS DIRECTORY ENTRY DEVICE AND METHOD

[75] Inventors: Frank S. Cheng, East Brunswick; Randall J. Penning, Middletown; Michael D. Porter, Flanders, all of N.J.

[73] Assignee: Lucent Technologies Inc., Murray Hill, N.J.

[21] Appl. No.: 579,175

[22] Filed: Dec. 27, 1995

[51] Int. Cl.⁶ .................................................. H04M 1/64
[52] U.S. Cl. ........................ 379/67; 379/355; 395/2.6
[58] Field of Search .................................. 379/67, 88, 89, 379/355, 356, 357; 395/2.55, 2.56, 2.6, 2.61, 2.83; 364/DIG. 1

[56] References Cited

U.S. PATENT DOCUMENTS

| | | | |
|---|---|---|---|
| 4,908,853 | 3/1990 | Matsumoto | 379/355 |
| 4,928,302 | 5/1990 | Kaneuchi et al. | 379/88 |
| 5,481,595 | 1/1996 | Ohashi et al. | 379/67 |

OTHER PUBLICATIONS

"Your Wildfire Electronic Assistant," Wildfire Communiations, Inc., Lexington, Massachusetts, 1995.

Primary Examiner—Fan S. Tsang

[57] ABSTRACT

The two-pass directory entry device includes a directory memory, a user interface device and a directory entry controller. The directory entry controller, in a first-pass, stores into the directory memory at least one name received from a user through the user interface device. In a second-pass, the directory entry controller stores at least one number received from the user through the user interface device. The directory entry controller recalls the at least one name stored in the directory memory, outputs the recalled at least one name to the user and associates the at least one number received in the second-pass with the at least one name received in the first-pass.

20 Claims, 5 Drawing Sheets

TWO-PASS DIRECTORY ENTRY DEVICE AND METHOD

BACKGROUND OF THE INVENTION

1. Field of the Invention

This invention relates to a device and method for entering additional directory entries in a directory memory.

2. Description of Related Art

Conventional telephone stations include directory features capable of storing a plurality of telephone numbers associated with names of parties to be called. Sophisticated telephone stations contain electronic memories capable of storing large numbers of names and associated telephone numbers. When a large number of directory entries is entered into a telephone memory, the time required is correspondingly large. Thus, there is a need to provide a more efficient telephone directory entry device and method especially for a busy person, such as a business executive, who cannot afford the time for entering telephone directory entries.

SUMMARY OF THE INVENTION

An object of the invention is to provide a two-pass directory entry device and method. The two-pass directory entry device includes a directory memory, a user interface device, a first voice print memory, a timer device and a directory entry controller. The directory entry controller, in a first-pass, stores into the directory memory at least one name received from a user through the user interface device. In a second-pass, the directory entry controller stores at least one data input received from the user through the user interface device. The directory entry controller recalls the at least one name stored in the directory memory, outputs the recalled at least one name to the user and associates the at least one data input received in the second-pass with the at least one name received in the first-pass.

The directory entry controller includes a timer device and a first voice print memory. The directory entry controller controls the directory memory, the timer device and the first voice print memory to receive the at least one name in the first-pass and the at least one data input in the second-pass. After requesting one of the at least one name from the user and receiving the first voice print from the user through the user interface device, the directory entry controller stores the first voice print into the first voice print memory.

Another objective is to provide a two-pass directory entry method for entering at least one directory entry into a directory memory. The method includes entering at least one name into the directory memory in a first-pass using a user interface device, recalling the at least one name from the directory memory, and entering at least one data input into the directory memory in a second-pass using the user interface device. The at least one data input is associated with the at least one name.

BRIEF DESCRIPTION OF THE DRAWINGS

The invention will be described in detail with reference to the following drawings, wherein.

DETAILED DESCRIPTION OF PREFERRED EMBODIMENTS

Figure 1:
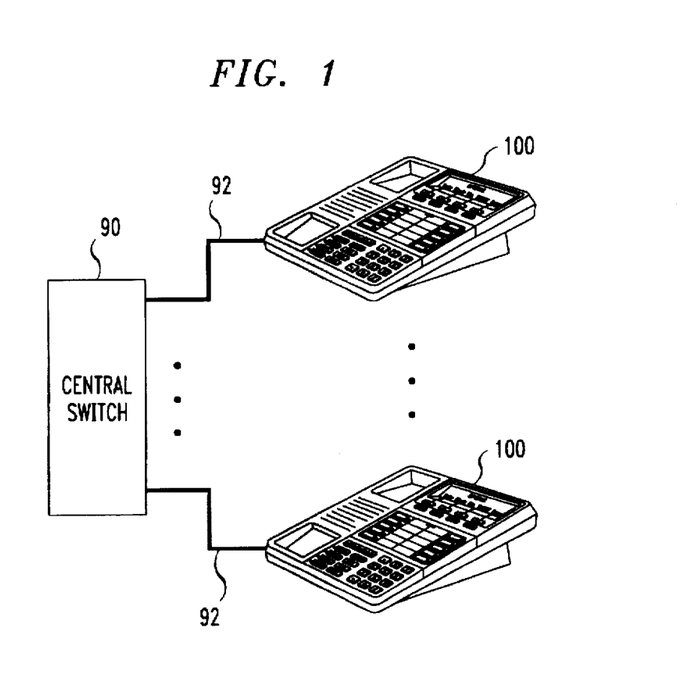
FIG. 1 is a block diagram of a plurality of telephone stations connected to a central switch.

FIG. 1 shows a block diagram including a plurality of telephone stations 100 connected to a central switch 90, such as a private branch exchange (PBX), through signal lines 92. Each of the signal lines 92 includes one bearer channel. The signal lines 92 may also include a signaling channel. The bearer channel carries digital or analog audio and/or application level data while the signaling channel carries interprocessor data. If the telephone station 100 is analog, separate bearer and signaling channels are not required.

Figure 2:
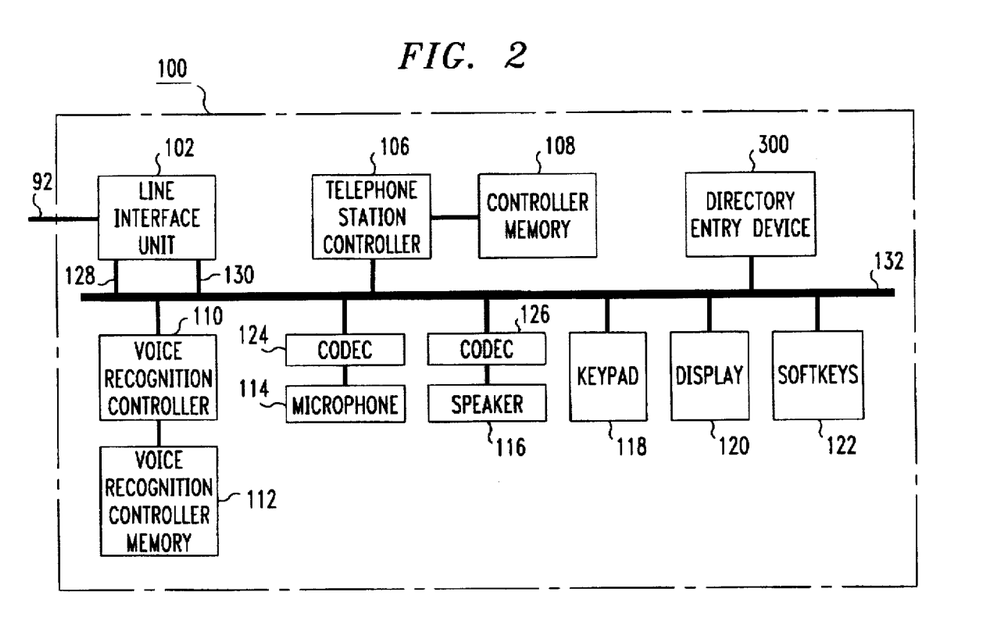
FIG. 2 is a block diagram of a preferred embodiment of a telephone station.

FIG. 2 shows a block diagram of the telephone station 100. The signal line 92 is input to the line interface unit 102. The line interface unit 102 converts the signal line 92 into one or more bearer channel 128 and a signaling channel 130. The signaling channel 130 contains information indicating that a caller has dialed a telephone number associated with the telephone station 100. The telephone station controller 106 scans the data on the signaling channel 130 through signal line 132. The signal line 132 interconnects the components of the telephone station 100 together. When the telephone station controller 106 detects that the telephone station 100 has been called, the telephone station controller 106 activates a telephone ringer (not shown) and when the user takes the telephone station 100 off-hook, the user is connected to the bearer channel 128 of the line interface unit 102 for conventional audio communication.

The voice recognition controller 110 connected to the signal line 132 also scans the signaling channel 130. When the voice recognition controller 110 detects special codes on the signaling channel 130, it accesses the bearer channel 128 and communicates with the external caller by outputting audio voice data and receiving audio voice commands from the caller.

Since the voice recognition controller 110 and the telephone station controller 106 can both interface directly with the bearer channel 128, two bearer channels 128 may be provided so that the voice recognition controller 110 and the telephone station controller 106 can both communicate through the two bearer channels 128 at the same time.

The telephone station controller 106 and the voice recognition controller 110 operate concurrently. However, if only one bearer channel 128 is available, then the telephone station controller 106 and the voice recognition controller 110 cannot both communicate through the single bearer channel 128. Thus, having two bearer channels 128 allows both the telephone station controller 106 and the voice recognition controller 110 to simultaneously communicate through the two bearer channels 128.

The voice recognition controller 110 and a directory entry device 300 interface with a user at the telephone station 100 through user interfaces such as a microphone 114, a speaker 116, a keypad 118, a display device 120, and soft keys 122. These user interfaces are coupled to the signal line 132 and are accessible by other telephone station elements such as the telephone station controller 106. The microphone 114 and the speaker 116 are connected to the signal line 132 through two CODEC (Coder Decoder) units 124 and 126, respectively.

If the directory entry device 300 requires additional information to be entered by the user, the directory entry device 300 speaks through the speaker 116 to inform the user of the required information. The directory entry device 300 may also request additional information from the user by displaying a request on the display device 120 in addition to speaking through the speaker 116. The user responds through the keypad 118 to enter the required data or simply talk to the directory entry device 300 through the microphone 114.

The directory entry device 300 also uses the display device 120 to indicate choices that the user may select. When options are displayed on the display device 120, the locations of the options are placed in a corresponding relationship with the soft keys 122. The user selects the displayed option by pushing a corresponding soft key 122.

Figure 3:
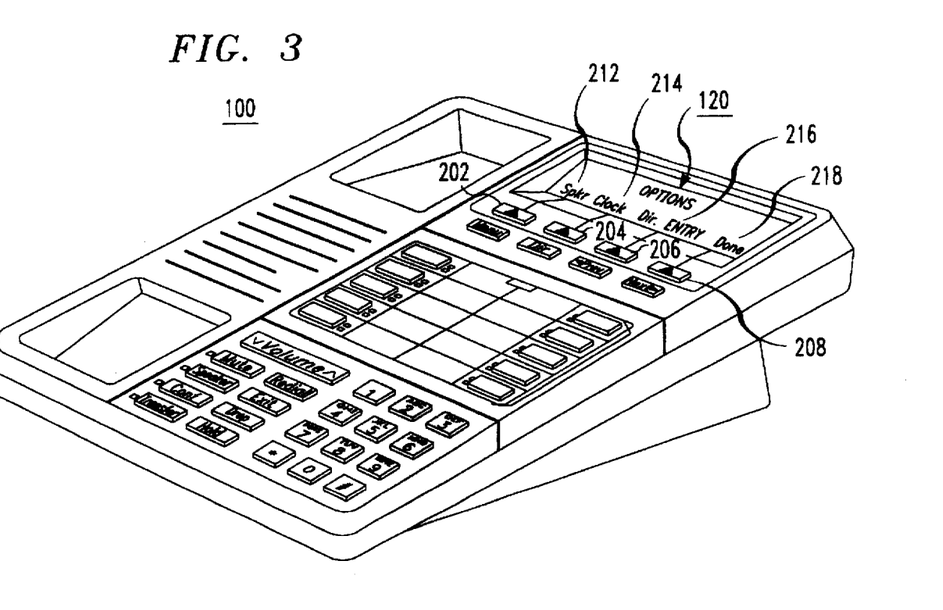
FIG. 3 is a diagram of soft keys.

FIG. 3 shows the display device 120 that has option display areas 212, 214, 216 and 218. Soft keys 202, 204, 206 and 208 are located close to the corresponding option selections displayed on the display device 120. The user selects the displayed option by simply pushing the corresponding soft key 202–208.

Figure 4:
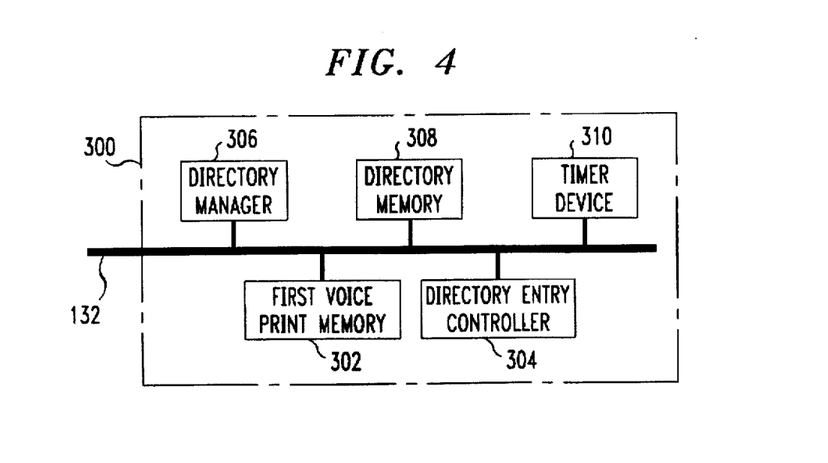
FIG. 4 is a block diagram of the directory entry device.

FIG. 2 shows the directory entry device 300 connected to the signal line 132. FIG. 4 shows the directory entry device 300 in greater detail. The directory entry device 300 includes a directory memory 308, a first voice print memory 302, a timer device 310 and a directory entry controller 304. The directory entry controller 304 controls, the directory memory 308, the timer device 310 and the first voice print memory 302. The directory entry controller 304 communicates with the voice recognition controller 110 through the signal line 132. The directory entry controller 304 also receives information from the keypad 118 and the soft keys 122, and outputs information to the user through the speaker 116 and on the display device 120.

When the user desires to add entries in the directory memory 308, the directory entry function is initiated by a voice command received through the microphone 114, by pushing a button on the keypad 118 or by pushing one of the soft keys 122 corresponding to a directory entry option display on the display device 120.

The voice recognition controller 110 sends a message to the directory entry controller 304 to begin the directory entry process when it recognizes a directory entry command from the sounds surrounding the telephone station 100. If the directory entry command is entered through either the keypad 118 or one of the soft keys 122, the directory entry controller 304 detects the entry of the command and begins the directory entry process.

When the directory entry process is started by one of the above methods, the directory entry controller 304 checks if the directory memory 308 is full. The directory memory 308 is full if there is not enough free memory in the directory memory 308 to store a directory entry having at least a preset amount of voice print data. For example, the directory memory 308 is full if there is insufficient memory to store an additional voice print of at least two seconds duration. If the directory memory 308 is full, the directory entry controller 304 requests the user to decide whether to delete a portion of the current directory entries to make room for the additional directory entries.

If the directory memory 308 is not full, the directory entry controller 304 searches the directory memory 308 and determines whether there are directory entries that do not contain telephone numbers. If there are directory entries without telephone numbers, then the directory entry controller 304 queries whether the user would like to add data such as telephone numbers to these directory entries. The directory entry controller 304 begins by assuming that the user desires to add names and data at the same time. However, options are provided during the add name and data process to allow the user to switch into add names only mode.

When activated, the directory entry controller 304 proceeds directly to an add names and data process. If during the add names and data process the user decides only to add names, the directory entry controller 304 receives the names that are input by the user and saves the added names for recall at a later time. When recalled, the saved names may be associated with data added for each of the saved names.

The directory entry controller 304 requests the user to enter the names either by pushing the keys of the keypad 118 or by speaking the names into the microphone 114. If the names are entered through the keypad 118, the directory entry controller 304 displays the entered names on the display device 120 as the keys are pushed. When all the names are entered by the user, the directory entry controller 304 stores the names into the directory memory 308 to be recalled later.

If the user enters the names by using the microphone 114, the directory entry controller 304 saves the voice print generated by the microphone 114 as the names to be added. The directory entry controller 304 may save the voice print directly into the directory memory 308 without any further verification or the directory entry controller 304 may request the user to say each name twice producing two voice prints. The directory entry controller 304 compares the two voice prints with each other and saves the voice print only if the two voice prints match each other.

If the directory entry controller 304 request two voice prints, it saves the first voice print in the first voice print memory 302. Then, the directory entry controller 304 requests the user to say the name again and compares the second voice print with the saved first voice print. If the first and second voice prints match, the directory entry controller 304 stores the voice print in the directory memory 308 and requests the user to say the first voice print of the next name to be stored.

However, if the first and second voice prints do not match, the directory entry controller 304 requests the user to speak the name again. This process continues until the directory entry controller 304 is able to match two voice prints or until the user decides to stop repeating the name. At this point, the user may either continue the entry process with other names or end the directory entry process.

The directory entry controller 304 sets the timer device 310 after each request for the user to say the name. If the user fails to say the name before the timer device 310 expires, the directory entry controller 304 increments a counter unless the counter value has exceeded a preset value. If the counter value is less than the preset value, the directory entry controller 304 outputs a message to the user and requests the user to speak the name again. If the counter value exceeded the preset value, then the directory entry controller 304 ends the directory entry process. If the user activates a cancel command by pushing a key on the keypad 118, pushing a soft key 122 or speaking a cancel voice command, the directory entry controller 304 ends the directory entry process. The timer device 310 is reset if the first and second voice prints do not match.

When adding names and data, the directory entry controller 304 receives the names either through the keypad 118 or through the microphone 114. The data may also be entered either through the keypad 118 or by speaking into the microphone 114.

When the user enters the names through the microphone 114, the directory entry controller 304 may enter the voice print directly into the directory memory 308 or requests the user to say the voice print twice as described earlier. After a match is obtained, the directory entry controller 304 enters the name into a directory entry of the directory memory 308.

After the user enters the name, the directory entry controller 304 requests the user to enter the data to be associated with the entered name. The data may be a data, but may also be data such as an account number, a voice message, and so on. The user may initialize the telephone station 100 for a predetermined number of types of data inputs. When the directory entry controller 304 is in the add names and data process, it will query the user for each type of data in a preset order also determined by the user. The directory entry controller 304 begins requesting data starting with the first data type. The user may bypass remaining data types by pushing a key of the keypad 118, pushing a softkey 122 or speaking a bypass voice command.

After the directory entry controller 304 requests the user to enter data, the user is also provided the option to choose the add names only mode. If the user chooses the add names only mode, the directory entry controller 304 stops requesting data and continue in the add name only mode until the directory entry process is ended. The directory entry controller 304 is switched into the add names only process by pushing a key of the keypad 118, by a soft key 122 or by speaking a voice command.

The directory entry controller 304 determines the directory entries that are without a telephone number when first activated and will determine the next name to recall from this initial determination. Thus, the user will be queried for each directory entry only once without being affected by the directory memory changes as new entries are made.

When the user chooses to enter data, the directory entry controller 304 sets the timer device 310 to an expiration value. If the data is not entered before the timer device 310 expires, the directory entry controller 304 increments a counter value. If the counter value is less than a preset value, the directory entry controller 304 outputs a message to the user and requests the user to enter the data again. If the counter value exceeds the preset value, the directory entry controller 304 ends the directory entry process.

After the user enters the data, the directory entry controller 304 adds the data to the directory entry that contains the name. Then, the directory entry controller 304 queries the user if there are additional names and data to be added. This process continues until the user enters all the names and data to be added or until the directory memory 308 becomes full.

When, at a later time, the user or an assistant to the user desires to add data corresponding to previously entered names, the directory entry controller 304 searches the directory memory 308 for directory entries without telephone numbers. If directory entries without telephone numbers are found, the directory entry controller 304 outputs to the user each of the stored names that does not have an associated telephone number. If the name was entered through the keypad 118, the directory entry controller 304 displays the name on the display device 120 or converts the text into voice and speaks the voice using the speaker 116. The user enters data through the keypad 118 or by speaking into the microphone 114 and the directory entry controller 304 associates the entered data with the displayed name and stores the name and data in the directory memory 308.

If the names were entered through the microphone 114, the directory entry controller 304 outputs the voice prints through the speaker 116. The user enters the data associated with the voice prints through the keypad 118 or the microphone 116 and the directory entry controller 304 stores both the voice prints and the associated data into the directory memory 308.

Figure 5:
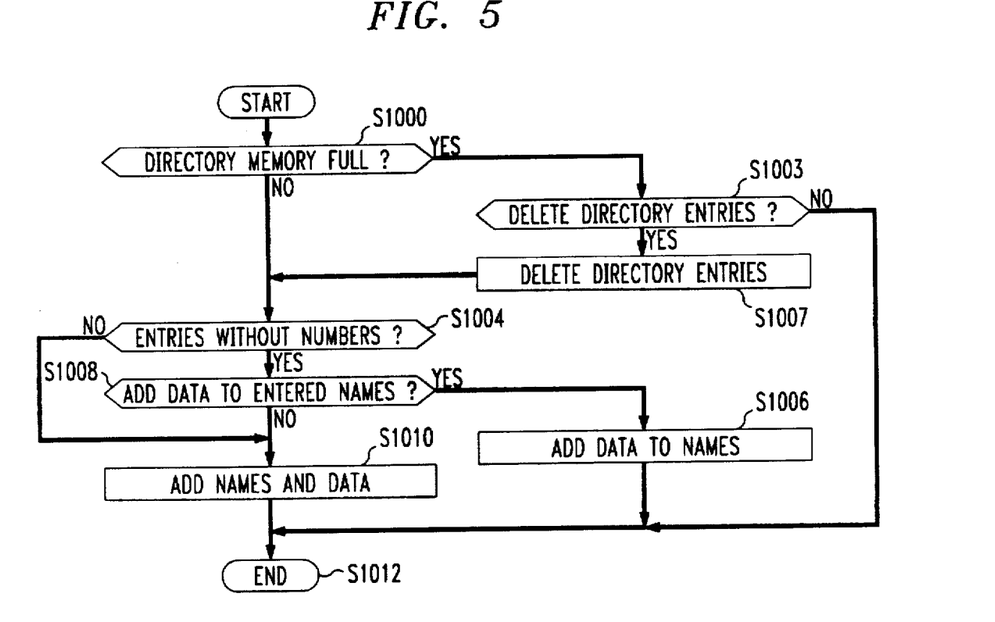
FIG. 5 is a flowchart of the add directory entry process.

FIG. 5 is a flowchart of the directory entry process. When the directory entry process is started the directory entry controller 304 enters step S1000. In step S1000, the directory entry controller 304 checks if the directory memory 308 is full. If the directory memory 308 is full, the directory entry controller 304 goes to step S1003. Otherwise, the directory entry controller 304 goes to step S1004.

In step S1003, the directory entry controller 304 queries the user either through the speaker 116 or by displaying a message on the display device 120 and inform the user that the directory memory 308 is full. The directory entry controller 304 queries the user whether to delete directory entries. If the user decides to delete directory entries, the directory entry controller 304 goes to step S1007. Otherwise, the directory entry controller 304 goes to step S1012. In step S1012, the directory entry controller 304 stops the directory entry process.

In step S1007, the directory entry controller 304 deletes directory entries as instructed by the user. After the user completes deleting directory entries, the directory entry controller 304 goes to step S1004.

In step S1004, the directory entry controller 304 determines whether there are directory entries without telephone numbers. If there are directory entries without telephone numbers, the directory entry controller 304 goes to step S1008. Otherwise, the directory entry controller 304 goes to step S1010. In step S1008, the directory entry controller 304 queries whether the user would like to add data to the directory entries that do not have telephone numbers. If the user chooses to add data to the directory entries without telephone numbers, the directory entry controller 304 goes to step S1006. Otherwise, the directory entry controller 304 goes to step S1010.

In step S1006, the directory entry controller 304 adds data to names in the directory memory 308 that do not have associated telephone numbers. When the user completed adding data to the directory entries, the directory entry controller 304 goes to step S1012.

In step S1010, the directory entry controller 304 adds names and data entered by the user. When the user completes entering the desired names and data, the directory entry controller 304 goes to step S1012.

Figure 6:
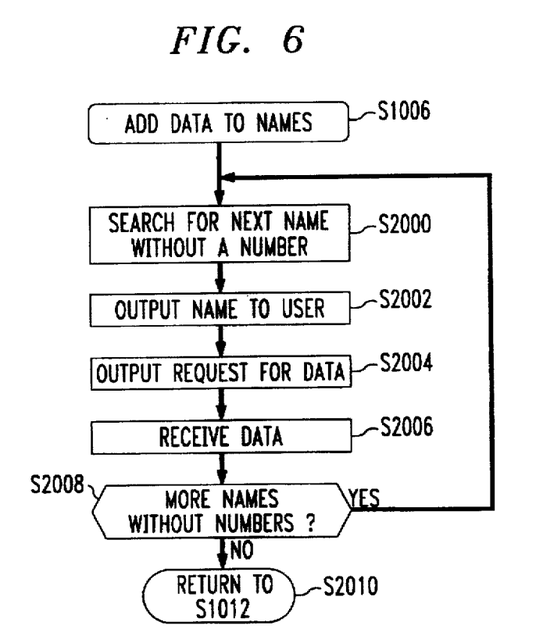
FIG. 6 is a flowchart of the add data to names process.

FIG. 6 shows the add data to names step S1006 in greater detail. In step S2000, the directory entry controller 304 searches the directory memory 308 for a next name without a telephone number and then goes to step S2002.

In step S2002, the directory entry controller 304 outputs the name to the user either through the speaker 116 or through the display device 120. Then, the directory entry controller goes to step S2004.

In step S2004, the directory entry controller 304 requests the user to enter data corresponding to the name that was output in step S2002. Then, the directory entry controller 304 enters step S2006. In step S2006, the directory entry controller 304 receives the data from the user through either the keypad 118 or the microphone 112. Then, the directory entry controller 304 goes to step S2008.

In step S2008, the directory entry controller 304 determines whether there is a name in the directory memory 308 that is not associated with a telephone number. If there is a name in the directory memory 308 that is not associated with a telephone number, the directory entry controller 304 goes to step S2000. Otherwise, the directory entry controller 304 enters step S2010 and returns to step S1012.

Figure 7:
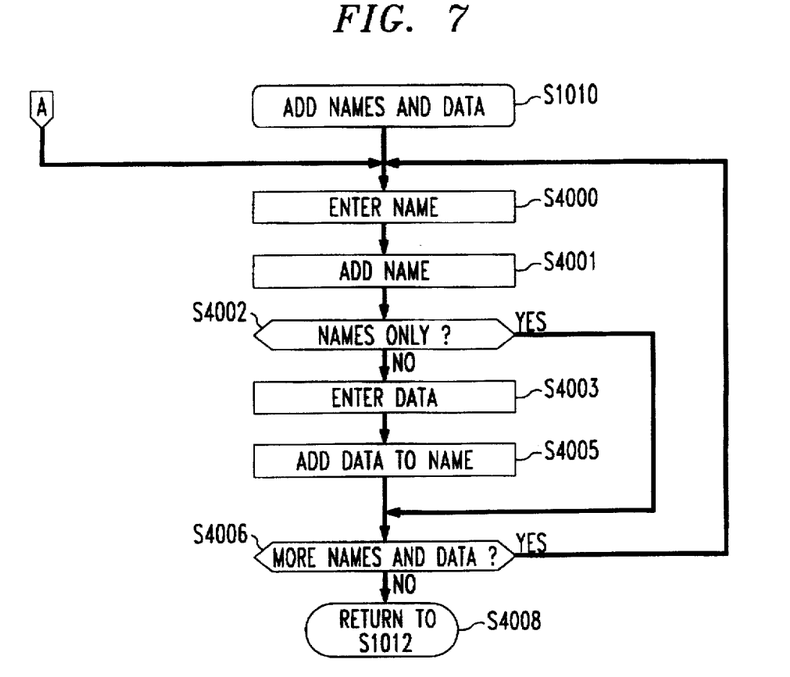
FIG. 7 is a flowchart of the add names and data process.

FIG. 7 shows the add names and data step S1010 in greater detail. In step S4000, the directory entry controller 304 requests and receives the name entered by the user and then goes to step S4001. In step S4001, the directory entry controller 304 adds the entered name to the directory memory 308 and then goes to step S4002. In step S4002, the directory entry controller 304 determines whether the directory entry process is in the add names only mode. The directory entry controller 304 begins in the add names and data mode. If the user chooses to add names only in step S4201 of FIG. 9 to be discussed later, the directory entry controller 304 goes to step S4006. Otherwise, the directory entry controller 304 goes to step S4003. The directory entry controller 304 always goes to step S4003 after the first time through step S4002 because the add names only option is selected only after the first time through step S4002.

In step S4003, the directory entry controller 304 requests the user to enter the data that corresponds to the name entered in step S4000 and associates the data with the name and then goes to step S4005. In step S4005, the directory entry controller 304 adds the name and the data entered by the user in step S4004 into the directory memory 308 and then goes to step S4006.

In step S4006, the directory entry controller 304 queries whether the user desires to enter more names and data. If more names and data are to be entered, the directory entry controller 304 goes to step S4000. Otherwise, the directory entry controller 304 goes to step S4008 and returns to step S1012.

Figure 8:
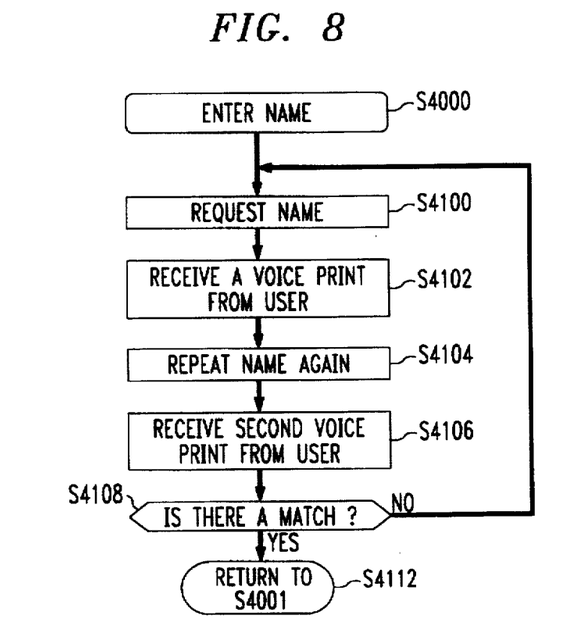
FIG. 8 is a flowchart of the entered name process.

FIG. 8 shows the enter name step S4000 in greater detail if the name is verified by requesting the user to repeat the name. In step S4100, the directory entry controller 304 requests the user to say a name into the microphone 114 and then goes to step S4102. In step S4102, the directory entry controller 304 saves a first voice print received from the microphone 114 into the first voice print memory 302 and then goes to step S4104. In step S4104, the directory entry controller 304 requests the user to repeat the name and then goes to step S4106. In step S4106, the directory entry controller 304 receives the second voice print from the microphone 114 and then goes to step S4108.

In step S4108, the directory entry controller 304 determines whether the first voice print matches the second voice print. If the first voice print does not match the second voice print, the directory entry controller 304 goes to step S4110. Otherwise, the directory entry controller 304 goes to step S4112 which returns to step S4001.

Figure 9:
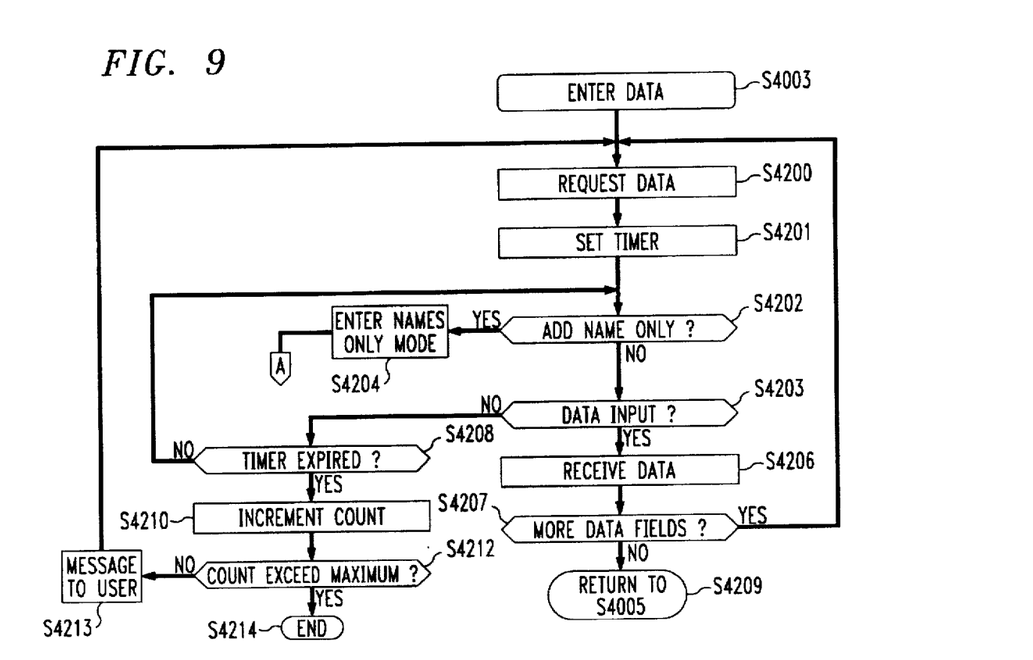
FIG. 9 is a flowchart of the entered data process.

FIG. 9 shows the enter data step S4003 in greater detail. In step S4200, the directory entry controller 304 requests the user to enter the data for the first data type corresponding to a name entered previously and then goes to step S4201. In step S4201, the directory entry controller 304 sets the timer device 310 and then goes to step S4202. In step S4202, the directory entry controller 304 determines if the user responded by selecting the add names only mode. If the user selected the add names only mode, the directory entry controller 304 goes to step S4204. Otherwise, the directory entry controller 304 goes to step S4203. In step S4204, the directory entry controller 304 enters the add names only mode and goes to step S4000 of FIG. 7 through connector A.

In step S4203, the directory entry controller 304 detects whether the data is input by the user. If the data is input by the user, the directory entry controller 304 goes to step S4206. Otherwise, the directory entry controller 304 goes to step S4208. In step S4208, the directory entry controller 304 checks if the timer device 310 has expired. If the timer device 310, has expired, the directory entry controller 304 goes to step S4210. Otherwise, the directory entry controller 304 returns to step S4202.

In step S4210, the directory entry controller 304 increments a counter value and goes to step S4212. In step S4212, the directory entry controller determines if the counter value exceeded a preset value. If the counter value exceeded the preset value, the directory entry controller 304 goes to step S4214 and ends the directory entry process. Otherwise, the directory entry controller goes to step S4213. In step S4213, the directory entry controller 304 outputs a message to the user and returns to step S4200.

In step S4206, the directory entry controller 304 receives the data entered by the user and associates the data with the name entered in step S4000 and saves the name and the data in the directory memory 308. Then, the directory entry controller 304 goes to step S4207.

In step S4207, the directory entry controller 304 determines whether the user initialized the telephone station 100 to receive more data types. If more data types are to be entered, the directory entry controller 304 returns to step S4200. Otherwise, the directory entry controller 304 goes to step S4209 and returns to step S4005.

Figure 10:
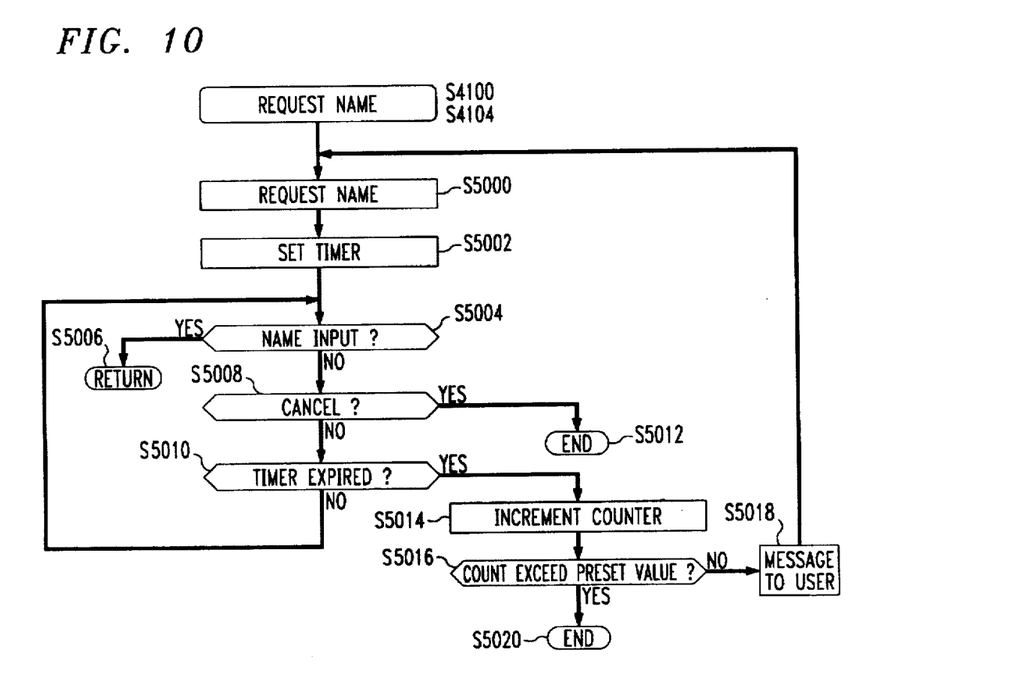
FIG. 10 is a flowchart of the request name process.

FIG. 10 shows steps S4100 and S4104 in greater detail. In S5000, the directory entry controller 304 requests the user to say a name. Then, the directory entry controller 304 goes to step S5002. In step S5002, the directory controller 304 sets the timer device 310 to an expiration value and then goes to step S5004.

In step S5004, the directory entry controller checks if the user has input a name through the microphone 114 or the keypad 118. If the user inputs a name, the directory entry controller 304 goes to step S5006. Otherwise, the directory entry controller goes to step S5008. In step S5006, the directory entry controller 304 returns to the step following the calling step. In step S5008, the directory entry controller 304 checks if the user activated the cancel command. If the user activated the cancel command, the directory entry controller 304 goes to step S5012 and ends the directory entry process. Otherwise, the directory entry controller 304 goes to step S5010. In step S5010, the directory entry controller 304 checks if the timer device 310 has expired. If the timer device 310 expired, then the directory entry controller 304 goes to step S5014. Otherwise, the directory entry controller 304 returns to step S5004.

In step S5014, the directory entry controller 304 increments a counter value and goes to step S5016. In step S5016, the directory entry controller 304 determines if the counter value exceeded a preset value. If the counter value exceeded the preset value, the directory entry controller goes to step S5020 and ends the directory entry process. Otherwise, the directory entry controller 304 goes to step S5018. In step S5018, the directory entry controller 304 outputs a message to the user and returns to step S5000.

The directory entry device 300 may be embodied in hardware using dedicated components to implement the timer device 310, the first voice print memory 302, the directory memory 308 and the directory entry controller 304. Application specific integrated circuits (ASIC) may also be used for each of the components listed above.

Portions of each component may be combined into different ASICs for optimum performance characteristics.

If the voice recognition controller 110 is a high powered processor such as a digital signal processor (DSP), the complete directory entry device 300 may be implemented as a program executed by the voice recognition controller 110. Alternately, the telephone station controller 106 in conjunction with the controller memory 108 may also implement the directory entry device functions.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A two-pass directory entry method for performing a directory entry function, a directory entry controller executing the two-pass directory entry method, the method comprising:

storing only a name for each of a plurality of directory items in a directory memory received from a user through a user interface device in a first-pass; and in a second-pass:
   a) in response to a request from the user, recalling the name for each of the plurality of directory items from the directory memory until each of the plurality of directory items has been recalled;
   b) outputting the name for each of the plurality of directory items recalled from the directory memory to the user through the user interface;
   c) receiving at least one data input from the user;
   d) associating each of the at least one data input with a corresponding name for each of the plurality of directory items recalled from the directory memory; and
   e) storing the name and the at least one data input in the directory memory for each of the plurality of directory items, wherein each at least one data input comprises a plurality of data types.

2. The two-pass directory entry method of claim 1, wherein each of the plurality of data types comprises at least one of a voice print and text entered through a keypad, wherein the name is a single identifying word.

3. The two-pass directory entry method of claim 1, wherein storing only a name for each of a plurality of directory items comprises for each of the plurality of directory items:
   a) outputting a first request to the user to say the name for each of the plurality of directory items;
   b) receiving a first voice print generated by the user interface device;
   c) saving the first voice print into a first voice print memory;
   d) outputting a second request to the user to say the name for each of the plurality of directory items;
   e) receiving a second voice print generated by the user interface device;
   f) determining whether the first voice print matches the second voice print; and
   g) storing one of the first and second voice prints into the directory memory if the first voice print matches the second voice print.

4. The two-pass directory entry method of claim 3, further comprising:
   (a) setting a first timeout value in a timer device after the first request;
   (b) outputting the first request again when the timer device expires before receiving the first voice print;
   (c) repeating (a) and (b) for at most a first preset number of times;
   (d) stopping the directory entry function if the first voice print is not received after outputting the first request the first preset number of times;
   (e) setting a second timeout value in the timer device after the second request;
   (f) outputting the second request again when the timer device expires before receiving the second voice print;
   (g) repeating (e) and (f) for at most a second preset number of times; and
   (h) stopping the directory entry function if the second voice print is not received after outputting the second request the second preset number of times.

5. The two-pass directory entry method of claim 3, further comprising:
   discarding at least one of the first and second voice prints after receiving the at least one of the first and second voice prints and before storing the at least one of the first and second voice prints in the directory memory if a cancel command is received from the user, the user activating the cancel command by one of pushing a key of a keypad, pushing a soft key and speaking a cancel voice command, wherein the directory entry controller receives the cancel command and discards the at least one of first and second voice prints.

6. The two-pass directory entry method of claim 1, further comprising:
   setting a third timeout value in the timer device after outputting the name for each of the plurality of directory items recalled from the directory memory; and
   stopping the directory entry function when the timer device expires before receiving one of the at least one data input from the user.

7. The two-pass directory entry method of claim 1, wherein storing the plurality of directory items comprises for each of the plurality of directory items:
   a) outputting a first request to the user to say the name for each of the plurality of directory items;
   b) receiving a first voice print generated by the user interface device; and
   c) saving the first voice print into a directory memory.

8. A two-pass directory entry device that performs a directory entry function, comprising:
   a directory memory;
   a user interface device;
   a directory entry controller that stores into the directory memory only a name received from a user through the user interface device for each of a plurality of name-only directory items in a first-pass, and recalls the name for each of the plurality of name-only directory items from the directory memory in response to a request from the user in a second-pass, wherein in the second-pass the directory entry controller outputs the name for each of the plurality of name-only directory items recalled from the directory memory to the user through the user interface device, receives at least one data input from the user, associates each of the at least one data input with the name recalled from the directory memory and stores the name and the at least one data input in the directory memory, and each at least one data input comprises a plurality of data types.

9. The two-pass directory entry device of claim 8, wherein each of the plurality of data types comprises at least one of a voice print and text entered through a keypad.

10. The two-pass directory entry device of claim 8, further comprising:

a timer device; and a first voice print memory, wherein the directory entry controller controls the directory memory, the timer device and the first voice print memory to execute the directory entry function.

11. The two-pass directory entry device of claim 10, wherein the directory entry controller outputs a first request to the user to say a name for one of the plurality of name-only directory items, receives a first voice print generated by the user interface device, saves the first voice print in the first voice print memory, outputs a second request to the user to say the name for the one of the plurality of name-only directory items, receives a second voice print generated by the user interface device, determines whether the first voice print in the first voice print memory matches the second voice print and stores the one of the first and second voice prints in the directory memory if the first and second voice prints match.

12. The two-pass directory entry device of claim 11, wherein the directory entry controller sets the timer device to a first timeout value after the first request and outputting the first request when the timer device expires before the first voice print is received, the directory controller outputting the first request at most a first preset number of times and stopping the directory entry function if the first voice print is not received after outputting the first request the first preset number of times.

13. The two-pass directory entry device of claim 12, wherein the directory entry controller sets the timer device to a second timeout value after the second request and outputting the second request when the timer device expires before the second voice print is received, the directory controller outputting the second request at most a second preset number of times and stopping the directory entry function if the second voice print is not received after outputting the second request the second preset number of times.

14. The two-pass directory entry device of claim 11, wherein the directory controller sets the timer device to a third timeout value after outputting to the user the first request, the directory controller stopping the directory entry function if the timer device expires before storing the one of the first and second voice prints in the directory memory.

15. The two-pass directory entry device of claim 11, further comprising a cancel signal, wherein the directory entry controller discards at least one of the first and second voice prints if the cancel signal is received from the user, the user activating the cancel signal by one of pushing a key of a keypad, pushing a soft key and speaking a cancel voice command, the directory entry controller discarding the at least one of the first and second voice prints after receiving the at least one of the first and second voice prints from the user and before storing the at least one of the first and second voice prints in the directory memory.

16. The two-pass directory entry device of claim 10, wherein the directory entry controller outputs a first request to the user to say a name for one of the plurality of name-only directory items, receives a first voice print generated by the user interface device, saves the first voice print in the directory memory.

17. The two-pass directory entry device of claim 8, wherein the directory entry controller comprises hardware units that perform functions of at least one of the timer device and the first voice print memory.

18. The two-pass directory entry device of claim 8, wherein the directory entry controller comprises a processor executing programs that perform functions of at least one of the timer device and the first voice print memory.

19. The two-pass directory entry device of claim 8, wherein the user interface device comprises at least one of a microphone, a speaker, a display device, a keypad, and soft keys.

20. The two-pass directory entry device of claim 8, wherein the two-pass directory entry device is embodied in a telephone station.

* * * * *